(12) United States Patent
Shanks et al.

(10) Patent No.: US 8,566,881 B2
(45) Date of Patent: Oct. 22, 2013

(54) LIVE INTEGRATION OF PUSH-TO-TALK (PTT) AUDIO WITH INDEPENDENT VIDEO FEED

(75) Inventors: David Eric Shanks, Los Angeles, CA (US); Paul N. Niesen, Safety Harbor, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 576 days.

(21) Appl. No.: 12/027,876

(22) Filed: Feb. 7, 2008

(65) Prior Publication Data

US 2008/0209476 A1 Aug. 28, 2008

Related U.S. Application Data

(60) Provisional application No. 60/888,660, filed on Feb. 7, 2007.

(51) Int. Cl.
*G06F 3/00* (2006.01)

(52) U.S. Cl.
USPC .................. 725/59; 725/25; 725/38; 725/39; 725/41; 725/43; 725/44; 725/45; 725/46; 725/91; 725/135

(58) Field of Classification Search
USPC ........... 725/59, 46, 41, 38, 25, 39, 43, 44, 45, 725/91, 135
See application file for complete search history.

(56) References Cited

U.S. PATENT DOCUMENTS

| | | | |
|---|---|---|---|
| 6,281,930 B1 * | 8/2001 | Parker et al. ............... | 348/211.9 |
| 6,870,919 B2 * | 3/2005 | Dobler ..................... | 379/207.02 |
| 2002/0138587 A1 * | 9/2002 | Koehler et al. .............. | 709/207 |
| 2004/0061607 A1 * | 4/2004 | Pargman .................. | 340/539.15 |
| 2007/0018952 A1 * | 1/2007 | Arseneau et al. ............ | 345/156 |
| 2007/0204302 A1 * | 8/2007 | Calzone .......................... | 725/46 |
| 2008/0066103 A1 * | 3/2008 | Ellis et al. ....................... | 725/38 |
| 2009/0037966 A1 * | 2/2009 | Rolls et al. .................... | 725/105 |

\* cited by examiner

*Primary Examiner* — Jivka Rabovianski

(57) ABSTRACT

The present invention discloses a mosaic video channel and a system for generating the mosaic video channel. A system in accordance with the present invention indicates an audio input for a mosaic video channel displayed on a monitor, with a plurality of individual video feeds being presented at a given time, and comprises a plurality of video cells presenting at least video information, each video cell having a respective audio portion associated with the video cell, an announcer audio portion, and an indicator, coupled to the respective audio portions, for indicating to an announcer that at least one of the respective audio portions is active.

13 Claims, 5 Drawing Sheets

LIVE INTEGRATION OF PUSH-TO-TALK (PTT) AUDIO WITH INDEPENDENT VIDEO FEED

CROSS-REFERENCE TO RELATED APPLICATIONS

This application claims the benefit under 35 U.S.C Section 119(e) of U.S. Provisional Application Ser. No. 60/888,660, filed on Feb. 7, 2007, by David E. Shanks et al., entitled "LIVE INTEGRATION OF PUSH-TO-TALK AUDIO WITH INDEPENDENT VIDEO FEED," which application is incorporated by reference herein.

BACKGROUND OF THE INVENTION

1. Field of the Invention

The present invention relates generally to satellite video systems, and in particular, to a method, apparatus, and article of manufacture for integration of various audio sources with video sources for presentation of multiple video cells in an on-screen display.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses a mosaic channel and a system for generating a mosaic channel.

A system in accordance with the present invention indicates an audio input for a mosaic video channel displayed on a monitor, with a plurality of individual video feeds being presented at a given time, and comprises a plurality of video cells presenting at least video information, each video cell having a respective audio portion associated with the video cell, an announcer audio portion, and an indicator, coupled to the respective audio portions, for indicating to an announcer that at least one of the respective audio portions is active.

Such a system further optionally includes the indicator signifying to the announcer to pause the announcer audio portion, the indicator indicating that the announcer audio portion is being superseded by the at least one respective audio portions, a controller, coupled to the plurality of video inputs, wherein the controller controls the indicator, the controller further controlling output of the announcer audio portion and the at least one respective audio portions to a receiver, the announcer providing the announcer audio portion in real time, and a satellite television delivery system for selectively delivering the plurality of video cells and the announcer audio portion to a plurality of receivers.

An apparatus in accordance with the present invention displays a mosaic video channel, the mosaic video channel having a plurality of video cells presenting at least video information within each video cell, the plurality of video cells being presented at a given time, and comprises a broadcast delivery system, comprising a transmitter and a receiver, a monitor, coupled to the receiver, for selectively displaying the mosaic video channel, each video cell associated with one of a plurality of individual video feeds, and an announcer audio portion selectively coupled to one of the plurality of individual video feeds which replaces a standard audio portion associated with that individual video feed.

Such an apparatus further optionally comprises the broadcast delivery system being a satellite television delivery system, a plurality of mosaic video channels, an indicator being used to select the announcer audio portion, the indicator indicating that the announcer audio portion is being superseded by the at least one respective audio portions, the announcer audio portion being generated in real time, and access being granted only to a subset of the plurality of mosaic video channels at a given time.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Interactive Mosaic Channel Display Diagram

Figure 1:
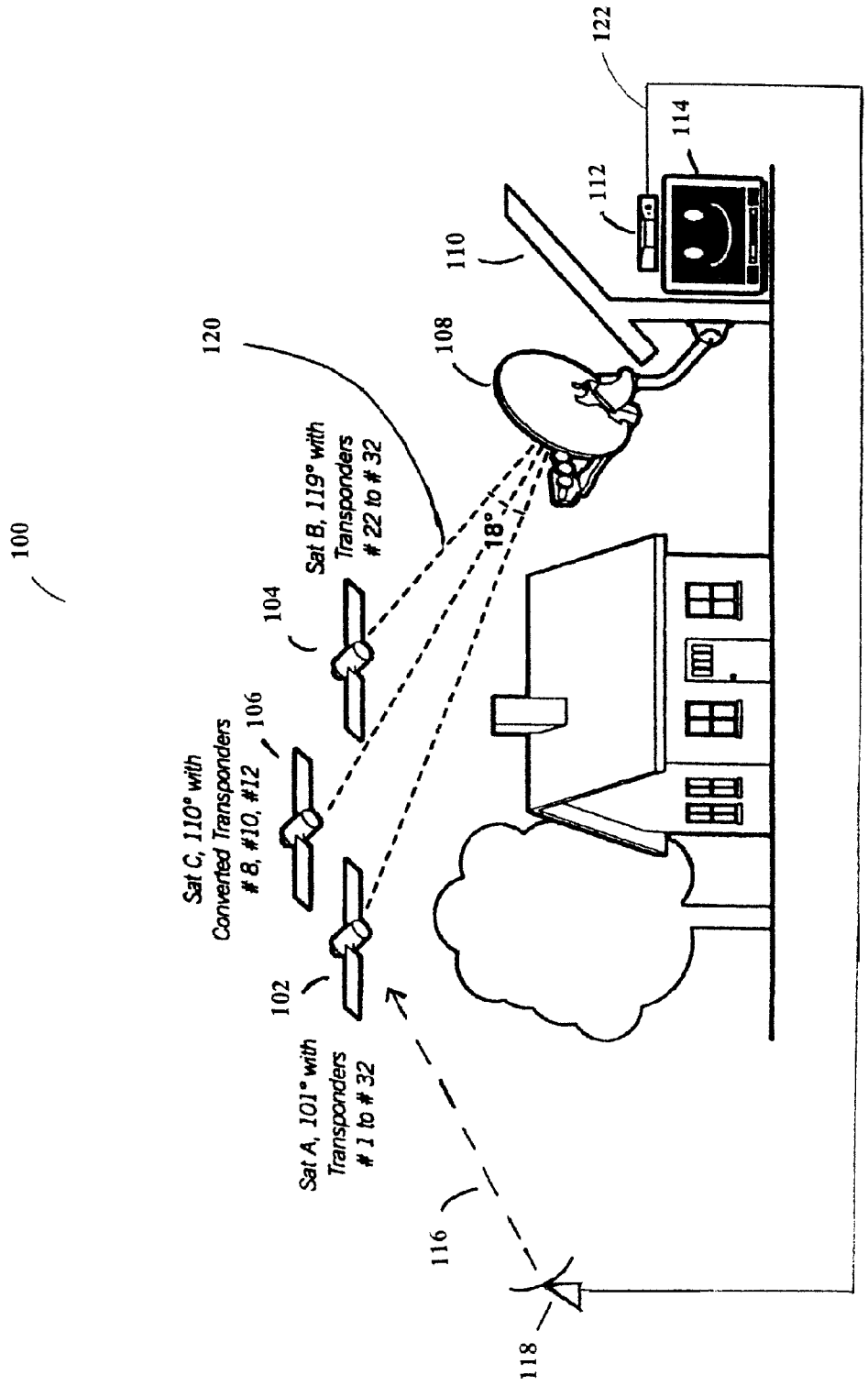
FIG. 1 illustrates a typical satellite television installation of the related art.
Figure 2A:
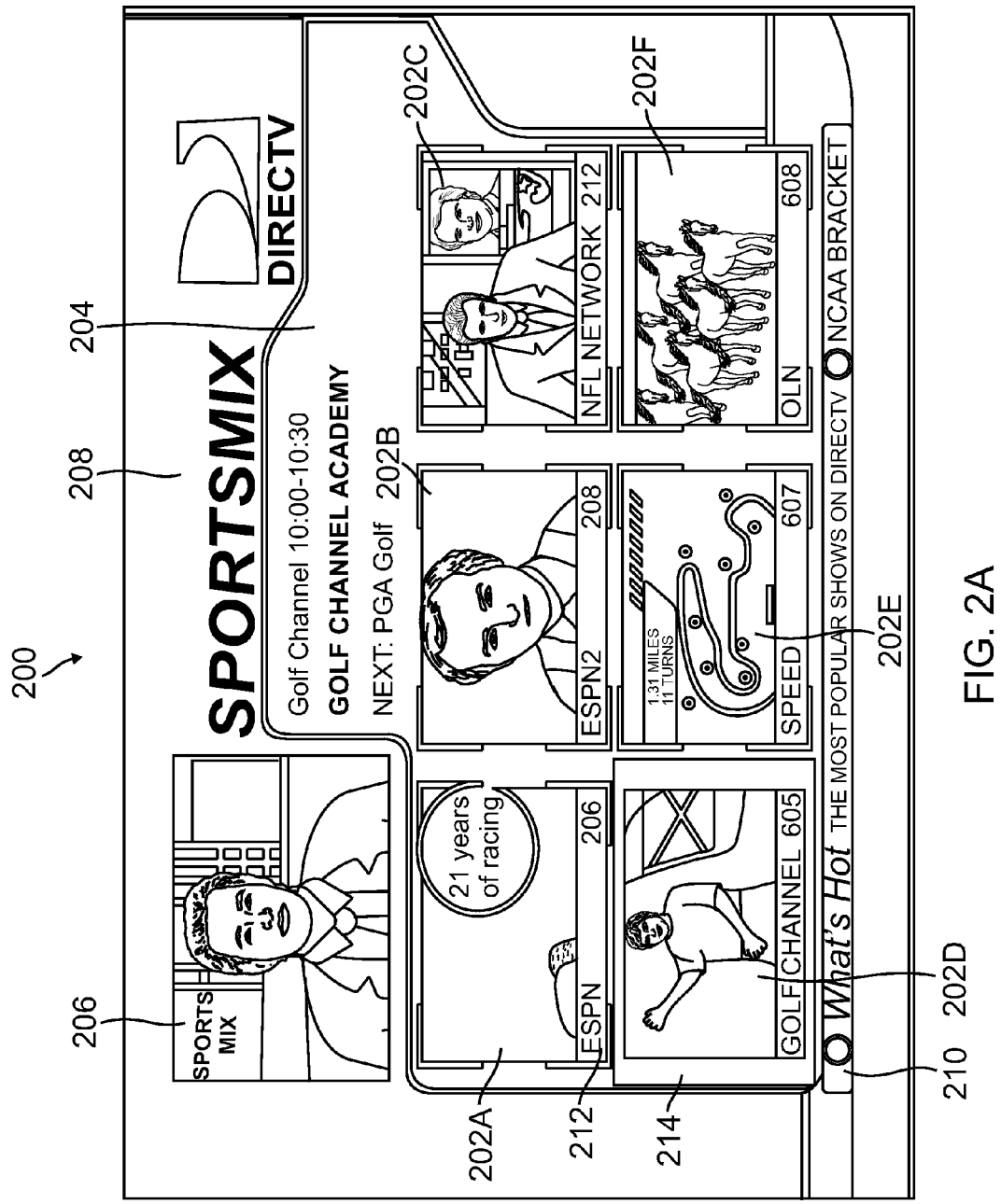
FIG. 2A illustrates a typical six-cell matrix with a generic video feed in accordance with the present invention.

FIG. 2A illustrates a typical matrix with a generic video feed in accordance with the present invention.

Interactive mosaic channel 200 is shown as being displayed on monitor 114. Within interactive mosaic channel 200, there are a number of video cells 202A-202F and a text box 204, also referred to as an On Screen Display (OSD) 204. Optionally, the interactive mosaic channel 200 further comprises a separate video cell 206, also called a "barker cell" 206, a background video 208, and a control bar 210. The video cells 202A-F optionally comprise a channel identification (channel ID) portion 212. Further, cursor 214 is also optionally included to allow for interaction with each of the video cells 202A-202F and barker cell 206.

The number of video cells 202A-F can change based on the number of video cells 202 A-F desired. As the number of video cells 202A-F increases, of course, there must be a reduction in the size of the video cells 202A-F to ensure that the video cells are differentiated on the monitor 114. As the number of video cells 202A-F decreases, the size of the video cells 202A-F can increase, since there is more space available on monitor 114 to display video cells 202A-F.

Further, the placement of video cells 202A-F, barker cell 206, text box 204, and control bar 210 is not limited to the positions on monitor 114 as shown in FIG. 2A. These elements can be displayed anywhere on monitor 114 without departing from the scope of the present invention.

As there are multiple video feeds and video cell 202A-F and barker cell 206 being presented, each video cell 202A-F and barker cell 206, as well as background video 208 and possibly control bar 210, have associated audio portions that can be played. Presenting more than one audio stream may be confusing; as such, it is typical that only one audio stream of information is presented at a given time. However, each of the video feeds may also have closed-captioning information associated with it, and selection of a closed-captioned presentation, rather than an audio presentation, can be performed as described herein.

Video Cells

Video cells 202A-F each comprise a separate viewer channel of programming. So for example, in an interactive mosaic channel that is focused on news programming, cell 1 could contain the video programming associated with the viewer channel of FOX News Channel, cell 2 could contain the video programming associated with the viewer channel of CNN, cell 3 could contain the video programming associated with the viewer channel of Headline News, cell 4 could contain the video programming associated with the viewer channel of MSNBC, cell 5 could contain the video programming associated with the viewer channel of The Weather Channel, and cell 6 could contain the video programming associated with the viewer channel of C-SPAN. The placement and video programming content for each video cell 202A-F can depend on a wide variety of factors, such as Nielsen ratings for a given channel, whether a given channel is available on a specific viewer's programming package, viewer channel number (lowest to highest or highest to lowest) or can be decided or changed based on programming that is present on one or more of the viewer channels available for the interactive mosaic channel. For example, and not by way of limitation, an important vote on the floor of the Senate may be taking place, and a decision can be made to change the placement of C-SPAN from video cell 202F to video cell 202A for a period of time. Changes in presentation for the interactive mosaic channel 200 are discussed below.

Within each of the video cells 202A-F is a channel identification (ID) box 212. Typically, the channel ID box 212 indicates to the viewer the moniker or name that is associated with the video feed being shown in that respective video cell 202A-F, and the viewer channel number associated with the video feed being shown in that respective video cell 202A-F. For example and not by way of limitation, in video cell 202A, which as described above, is showing the video feed for ESPN, channel ID box 212 would indicate "ESPN" as well as, optionally, a channel number, e.g., "206" to indicate to the viewer that the video feed being shown in video cell 202A is that of ESPN, and that the viewer is accustomed to seeing this full-monitor 114 video programming on viewer channel 206.

Other information may also appear in channel ID box 212, such as an indication that the video feed that is being presented in the associated video cell 202A-F is a "user favorite" channel, the channel ID box 212 may be presented in a different color or video texture to indicate that the video feed that is being presented in the associated video cell 202A-F is a channel that presents programming that adults may wish to block from their children's view or has closed-captioning available, etc. Many possibilities are available within the scope of the present invention to present various types of video information within channel ID box 212 for viewer selection and benefit. The channel ID box 212 may also appear without a video cell 202A-F for those video feeds that are channel blocked via parental control, or otherwise unavailable to a specific viewer because of the viewer's programming package or other reasons.

Text Box

Text box 204 contains textual information that is useful to the viewer, and this information can change depending on the viewer's selection of interactive services as described herein. For example, the text box 204 can contain a generic statement about the genre of the interactive mosaic channel 200, or statements directed to a selected video cell 202A-F or information related to the channel ID box 212 to describe to a user the meaning of the information presented in the channel ID box 212 or other information related to the video cell 202A-F and channel ID box 212. The text box can also scroll to present additional information to the viewer that does not all fit within text box 204 at a given time.

There can also be default text associated with each interactive mosaic channel 200, and, depending on the capabilities of IRD 112, each time an interactive mosaic channel 200 is tuned to, a default descriptive text shall be displayed in the text box 204.

Barker Cell

Barker cell 206 is a presentation of video data that can relate to the video cells 202A-F that are present in interactive mosaic channel 200. For those interactive mosaic channels 200 that have the optional barker cell 206, the barker cell 206 can use audio or video clues to direct the user to one of the video cells 202A-F for more information on a given topic, or provide an overview of the information presented within the video cells 202A-F. For example, the audio and video associated with barker cell 206 in a news format can be a series of stories that are being covered in more depth on the viewer channels being shown in video cells 202A-F, and the barker cell 206 audio and video can then direct the viewer to tune the IRD 112 or monitor 114 to a specific video cell 202A-F for more information on that topic. The barker cell 206 can also be used to provide an overview of the news stories, either those presented in video cells 202A-F or other news stories of interest, without directing the viewer to one of the video presentations being discussed in the video feeds shown in video cells 202A-F.

Barker cell 206 can present audio and video information that is not available on any other viewer channel that is accessible to IRD 112 or monitor 114, other than within the barker cell 206 of the interactive mosaic channel 200. When the barker cell 206 presents audio and video information that is not present on any other viewer channel accessible to IRD 112 or monitor 114, then the barker cell 206 does not have an associated channel ID box 212.

Background Video

Background video 208 is typically a backdrop for the interactive mosaic channel 200. The background video 208 can be related to the genre of the interactive mosaic channel 200; for example, in a news environment, the background video 208 can be related to a top news story, the stock market exchange building, a prominent government building, etc. The background video 208 can be changed or can be a dynamic video depending on the desires of the editorial staff or viewer preferences. Further, the background video 208 can be a logo or other indicator of the source of the interactive mosaic channel 200, such as DIRECTV.

Interactive Features

Figure 2B:
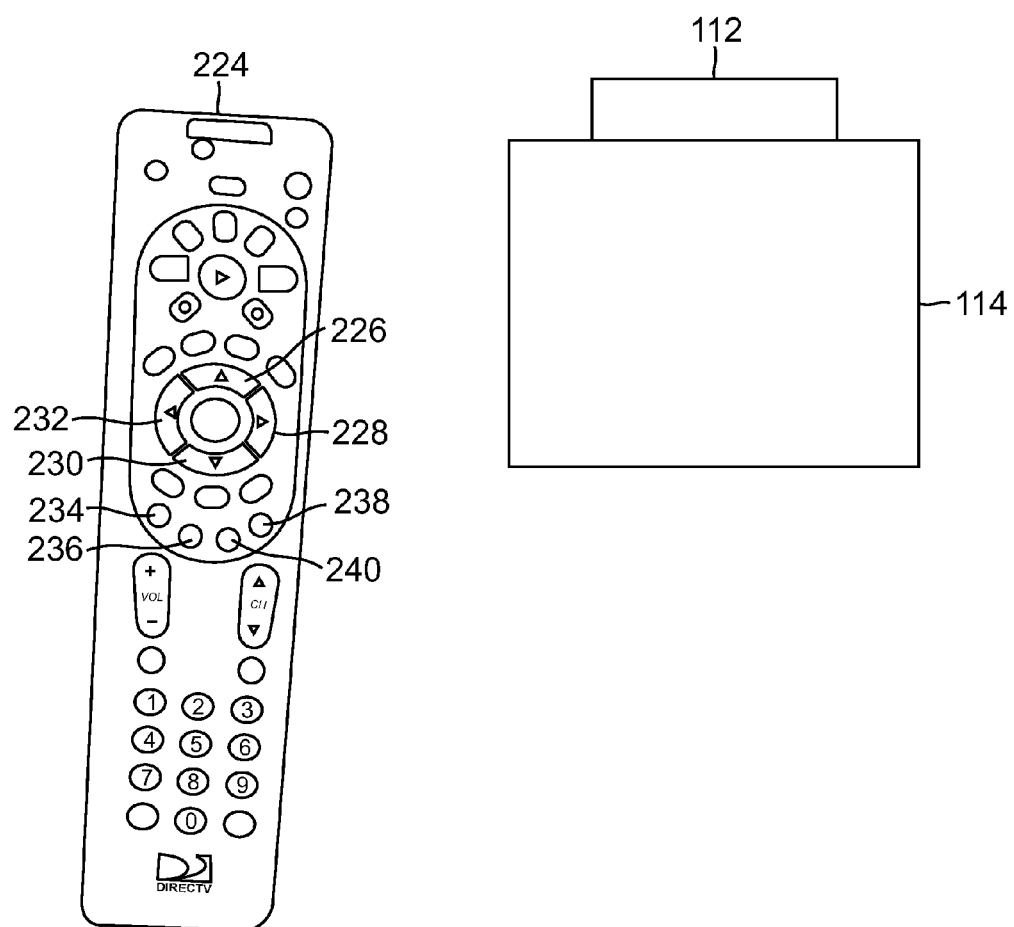
FIG. 2B illustrates a remote control used in the present invention.

FIG. 2B illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

Each video cell 202A-F has an associated channel ID box 212, and one of the video cells, cell 202D, has a cursor 214 surrounding that specific video cell 202 and, optionally, channel ID box 212. The cursor 214 indicates that the specific video cell 202 and channel ID 212 has been selected by the viewer. The cursor 214 is typically controlled by buttons 226-232, but can be controlled by other buttons on the remote control 224 if desired.

By selecting a given video cell 202A-F, the viewer is selecting a specific characteristic associated with that given video cell 202A-F, or associated video feed used to generate that video cell 202A-F. In most instances, when the viewer selects a given video cell 202, the audio portion associated with the selected video cell 202 will be presented to the viewer, rather than the audio portion associated with the barker cell 206 or a generic audio track that is associated with interactive mosaic channel 200. Further, selection of a given video cell 202A-F with cursor 214 may also select a closed captioning data stream associated with the selected video cell 202, depending on the availability of such a data stream and/or other settings that a viewer has selected. Cursor 214 can be moved to any of the video cells 202A-F, and, optionally, can be moved to select text box 204 or control bar 210.

When cursor 214 is moved to a given video cell 202A-F via buttons 226-232, text box 204 also may undergo a change in information. Typically, when the video cell 202A-F is selected by the viewer, indicated by the presence of cursor 214, text box 204 will present the information in the Advanced Program Guide (APG) that is associated with the viewer channel selected by cursor 214. The APG typically includes information on the program or "show" that is currently being presented by the viewer channel shown in video cell 202A-F, as well as the time that show is being aired and the next show to be aired on that viewer channel. Other information, either in the APG or external to the APG, can also be displayed in the text box 204 when the cursor is moved to a given video cell 202A-F.

As such, the viewer can "interact" with the interactive mosaic channel 200 and decide which audio track to listen to, find out a plot line of each of the shows being presented in the various video cells 202, find out what is going to be aired next in the various viewer channels being presented in video cells 202, or listen to generic audio from the barker cell 206 or associated with the interactive mosaic channel 200 itself while variously viewing the video presentations in the video cells 202. If a specific video cell 202 presents video information that is of interest to a viewer, then the viewer can move cursor 214, via a remote control command, to a given video cell 202, and listen to the audio associated with that video cell 202 and find out more about that viewer channel in text box 204.

If the viewer decides that the selected video cell 202 is of enough interest, the viewer can then directly tune to the selected video cell 202, i.e., tune directly to that viewer channel that is providing the video and audio used to create video cell 202, by pressing a single button on the remote control 224 (typically the "select" button on a DIRECTV remote control). This will tune the IRD 112 or monitor 114 to that viewer channel, which will then be presented full-screen to the viewer as in a normal television monitor 114 viewing format.

The barker cell 206, since it typically contains audio and video information that is not located on any viewer channel other than the interactive mosaic channel 200, cannot typically be selected for full screen viewing by the viewer on monitor 114. However, the barker cell 206 can be selected for full monitor 114 viewing, or at least enough of the monitor 114 to allow for changes in the video cells 202 as described below, to allow for changes in the interactive mosaic channel 200 and in the control bar 210 in near-real-time.

Control Bar

The Control Bar 210 (also called the Attract Icon or the Attract Icon Bar) The control bar 210 allows for instant, on-screen access to several data sources that allow the viewer to access data related to that being shown in the video cells 202A-F as well as other viewer channels available within system 100. Those IRDs 112 that have interactive capabilities have special buttons that correspond to the icons that appear on the control bar 210. Each icon/button directs the viewer to a different screen, such as special events, or, in the case of the present invention, data related to real-time or near-real-time viewership of channels within system 100. Each screen can have sub-screens that further allow related data to be viewed or otherwise analyzed by the viewer. Further, control bar 210 can comprise statistics, data, or other information related to the video cells 202A-F being shown in monitor 114.

For example, and not by way of limitation, one of the remote control 224 buttons, e.g., the "red" button 234, indicated by text and/or graphics on control bar 210, may take a viewer to the "What's Hot" page, where viewers can review data related to viewership of shows currently being aired within system 100.

Similarly, a "special" page can be accessed by pressing a different button on the remote control 224, e.g., the "green" button 236, or the blue button 238 or yellow button 240, where viewers can view a channel or other data page. The special page can be reprogrammed by the system provider or the viewer based on time, or, in the case of interactive mosaic channel 200, can be done by genre. For example, and not by way of limitation, the special page can be assigned to the NCAA bracket for a "Sports" mosaic channel 200, and, if the viewer changes to a "News" mosaic channel 200, the special page can be a breaking news channel or news recap video loop that is provided by the system provider. There can be more than one special "page" that is accessible from the buttons 234-240, or other buttons on the remote control 224, if desired.

Monitor Displays

Figure 3:
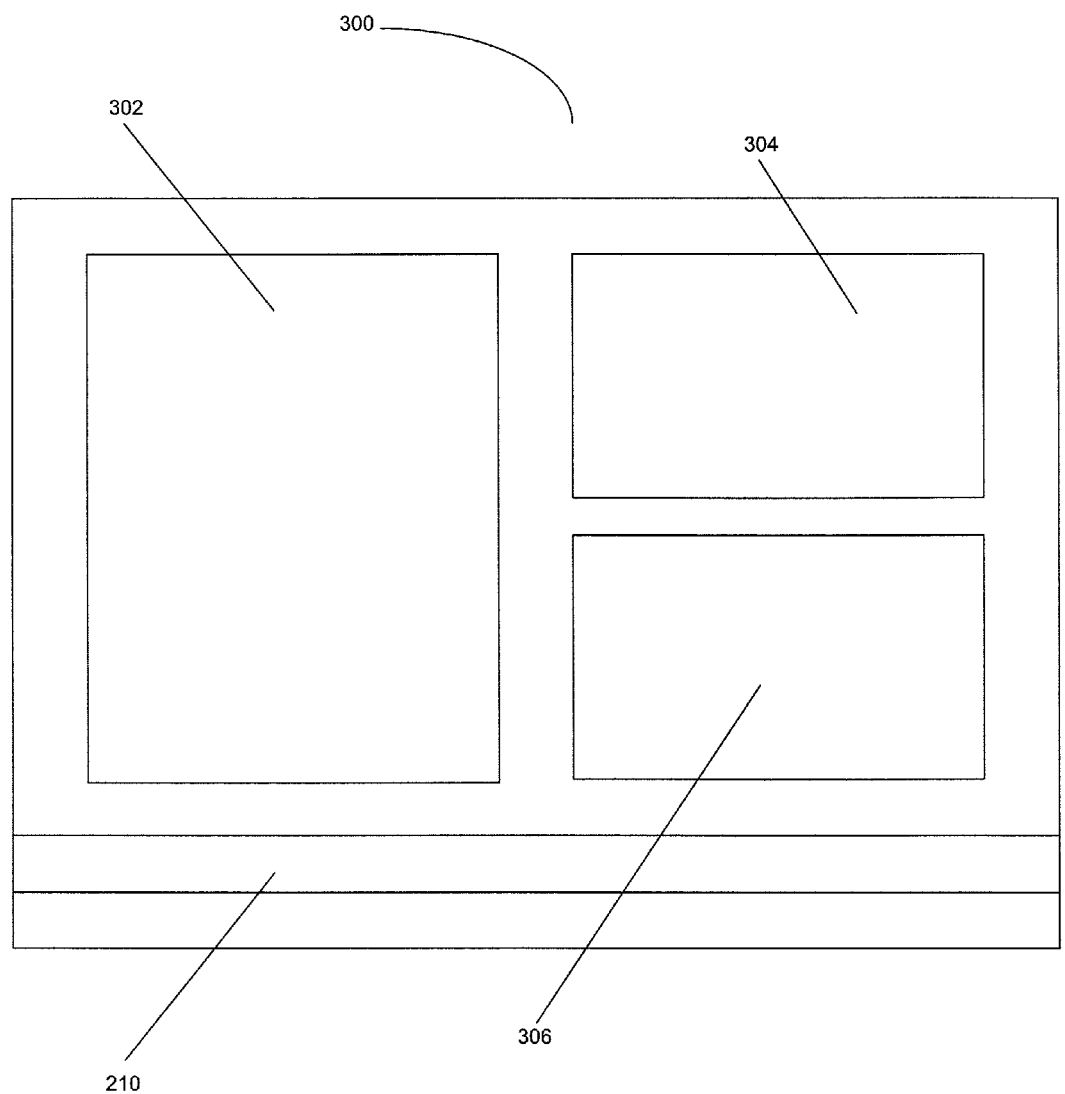
FIG. 3 illustrates an example of the usage of a system in accordance with the present invention.

FIG. 3 illustrates an example of the usage of a system in accordance with the present invention.

Screen 300 illustrates a specific embodiment of screen 200 shown on monitor 114, with a first video cell 302, second video cell 304, third video cell 306, and control bar 210 displayed on monitor 114. The location, size, and other display features of each of the video cells 302-306 are determined by a controller (not shown). The screen 300 is thus a composite video display of video and audio sources.

Video cells 302-306 can be video presentations that are unique to a given viewer channel, or can be network feeds or other video information that is available on other viewer channels or on network channels. Control bar 210 can provide text, statistics, or other information that is related to one or more of the video cells 302-306, or to other video information that is not being shown in screen 300.

For example, and not by way of limitation, screen 300 can be a driver channel that is associated with a specific driver in a NASCAR race. Video cell 302 can be the "in car" camera for that driver, video cell 304 can be the network feed of the race leaders, and video 306 can be a crew chief video or pit crew video associated with the driver. Control bar 210 can show statistics related to the overall leader, as well as statistics that relate this driver to the leader in terms of seconds behind, race standing for this driver, number of laps completed, engine temperature for this driver's car, tachometer/speedometer reading for this driver's car, etc.

During certain times in the race, the video information of one or more of the video cells 302-306 has audio associated with the video; at other times, there is an announcer (similar to the barker on the barker screen) that talks about the video and provides color commentary or information of interest to a viewer. For example, and not by way of limitation, one of the video cells 302-306 is the "driver cam" perspective, e.g., the driver's view of the race. During race conditions, this is an important shot; but most times, the driver is not talking to the crew or to the crew chief. As such, it would not be as interesting for a viewer to pay attention to this portion of the screen 300 if there is no associated audio track with that given video cell 302-306.

So, when the driver is silent, an announcer or barker gives commentary on the race, the driver, or other items of interest to a viewer. However, the announcer or barker must know when the driver is talking, so that the audio from the announcer and the audio from the driver do not interfere with each other. A similar problem exists for the other video cells 302-306; the announcer must know when there is a competing audio stream so that the announcer will remain silent during that portion of video.

Figure 4:
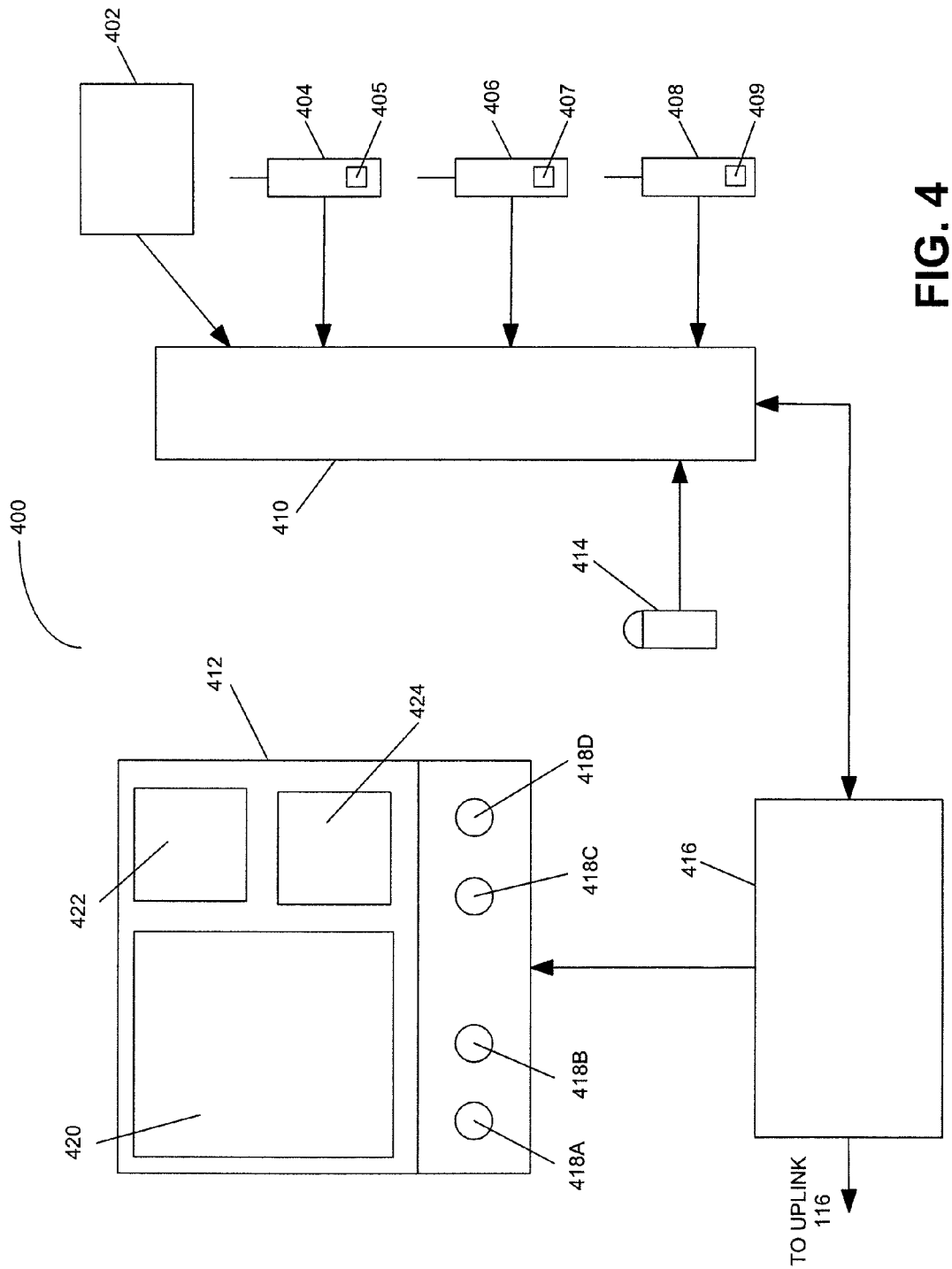
FIG. 4 illustrates an embodiment of the present invention.

FIG. 4 illustrates an embodiment of the present invention.

System 400 shows camera 402, audio sources 404-408, each with a corresponding PTT switch 405, 407, and 409, mux 410, monitor 412, microphone 414, and controller 416. Camera 402 and audio sources 404-408 provide inputs to mux 410, which inputs are controlled by controller 416 and delivered to monitor 412. Audio sources 404-408 and camera 402 can provide inputs to mux 410 via hardwired or Radio Frequency (RF) links without departing from the scope of the present invention.

Monitor 412 is also equipped with one or more tally lights 418A-D and has video cells 420-424 displaying various video shots of a given event. Commentators (barkers) watch these video cells 420-424, or, alternatively, watch the event itself, and comment on the event using microphone 414, which provides audio that is sent out over uplink 116.

However, when one or more of the audio sources 404-408 are activated, i.e., the PTT switch 405, 407, or 409 is depressed, the announcer watching the video cells 420-424 (or, alternatively, the event itself) must know when to keep quiet so that the audio from the audio sources 404-408 can be played through mux 410 and controller 416 and sent via uplink 116 to those IRDs 112 that are viewing or recording the events being shown on screen 300. As such, tally lights 418A-D provide the announcer an indication that one or more of the audio sources 404-408 have been activated, and, as such, sound from the audio sources 404-408 is being sent over the air to uplink 116.

For example, and not by way of limitation, the announcer may be viewing video cell 420 (which may correspond to video cell 302 on screen 300). Video cell 420 will typically be an "in car" camera showing the driver of a given car in a NASCAR race, but can be any camera or other video source. When the driver is driving, there is no sound that is discernable from the driver's microphone, and, as such, an announcer is providing commentary about the driver, their position in the race, who their closest competitor is, etc. However, when the pit crew and/or crew chief wants the driver to come in for a pit stop, or has some other information to tell the driver, one or more of the audio sources 404-408, which are typically walkie-talkies but can be other audio sources, will break into a dedicated audio channel and deliver an audio message to the driver. When the walkie-talkie "Push-to-talk (PTT)" button 405, 407, and/or 409 is depressed, it not only allows a person to talk, but the act of depressing the PTT button 405-409 will light one or more of the tally lights on the screen 412, to indicate to the announcer that someone else is providing audio that may be of interest to the viewers. Further, this audio is probably not associated with the video being shown on monitor 412, screen 300, or any other video that the viewer is watching.

Having multiple tally lights can indicate to the announcer, as well as to the viewer (via control bar 210 or some other indicia on screen 300) who is talking on the audio sources 404-408. So, for example, one of the audio sources, e.g., audio source 408, can be an in-car microphone for the driver to speak into. Another audio sources, e.g., audio source 404, can be assigned to the crew chief, and another audio source, e.g., audio source 406, can be assigned to the pit crew. Each tally light 418A-D can indicate who is talking, and, thus, the announcer can wait for the conversation to finish and comment on the conversation intelligently. Further, knowing where the audio source 404-408 came from via multiple tally lights 418A-D (and corresponding information being sent from mux 410 to controller 416) allows viewers to know "who said what" in a given conversation. Screen 300 can have a pop-up video bubble, or control bar 210 can have a name or title appear, when a given audio source 404-408 is activated.

As an example, when the driver depresses the PTT button 409 on their audio source 408, the left-most tally light 418A is illuminated on screen 412, and control bar 210 can indicate that the driver is talking, which audio is being heard by the viewer. When the crew chief responds on audio source 404, and presses their PTT switch 405, the right-most tally light 418D illuminates, and control bar 210 indicates that the crew chief is talking, etc. As such, the viewer and the announcer know who is speaking based on a visual clue or indicia, rather than recognizing or knowing the voice of the driver, crew chief, pit crew, etc. Further, the announcer watching screen 412 knows when to provide commentary and when to be silent and allow the event to unfold in real-time, with audio sources provided by the participants themselves.

When the driver enters the pit area, the viewer will likely want to hear the pit crew rather than the announcer, and hear what the crew chief has to say about the pit stop because such information will be of greater voracity and importance than the announcer's best guess or interpretation of what is going on in the pit area.

As discussed herein control bar 210 also may undergo changes based on the audio source being sent to uplink 116. For example, the control bar can indicate the person speaking, which can change based on the audio source 404-408 or microphone 414. Control bar 210 can also be sent information based on the content of the audio source 404-408, e.g., if a tire change is expected at the next pit stop based on the conversation held between audio source 404 and audio source 408, that information can be displayed on control bar 210 for the viewer to see.

The present invention can be used at any filming location where multiple camera inputs are used, and where multiple camera viewing on screen 300 is desirable. For example, and not by way of limitation, a football game can have a camera angle on the line of scrimmage shown in video feed 302 of FIG. 3, a second camera can be following a star player (who may be wired with a microphone) and shown in video feed 304, and the coach, either the head coach or the offensive coordinator, can be shown in video feed 306. The viewer can then listen to audio from the network feed (video feed 302), the audio from the receiver (video feed 304) or the coach (video feed 306) based on tally light 418A-D illumination, or other factors. As timeouts are called, or field goals are attempted, or other events occur during the contest, the audio source 404-408 can be changed on uplink 116 to peak interest in the viewer, or to give the viewer additional information not available to a viewer of only the network feed. So, for example, a viewer watching screen 300 can know, for example, when a fake punt is being attempted, when a draw or pass play is being called, etc., while a person viewing the network feed would not have access to that information. Such a change in the audio associated with screen 300 allows the viewer to have a more in-depth experience with the program that the viewer is watching.

Although shown as an indicator light, tally lights 418A-D can be other indicia, e.g., light-emitting diodes, other light sources sound producing devices, or, if desired, an automatic "kill" switch in combination with a tally light 418A-D to not only indicate to the announcer that someone else is talking, but to prevent microphone 414 from operating when other audio sources 404-408 are in use. In other words, microphone 414 is electronically coupled to the PTT switches 405, 407, and 409 of each of the audio sources 404-408, such that only one audio source 404-408 and 414 can operate at a given time. However, audio inputs from microphone 414 are not relayed to the audio being presented on audio sources 404-408. The prioritization of the audio sources 404-408 and 414 can be performed by hardware (typically in mux 410) or in software (typically running in controller 416). Such prioritization can be changed as situations surrounding the event being covered dictate.

Conclusion

The present invention discloses a mosaic video channel and a system for generating the mosaic video channel. A system in accordance with the present invention indicates an audio input for a mosaic video channel displayed on a monitor, with a plurality of individual video feeds being presented at a given time, and comprises a plurality of video cells presenting at least video information, each video cell having a respective audio portion associated with the video cell, an announcer audio portion, and an indicator, coupled to the respective audio portions, for indicating to an announcer that at least one of the respective audio portions is active.

Such a system further optionally includes the indicator signifying to the announcer to pause the announcer audio portion, the indicator indicating that the announcer audio portion is being superseded by the at least one respective audio portions, a controller, coupled to the plurality of video inputs, wherein the controller controls the indicator, the controller further controlling output of the announcer audio portion and the at least one respective audio portions to a receiver, the announcer providing the announcer audio portion in real time, and a satellite television delivery system for selectively delivering the plurality of video cells and the announcer audio portion to a plurality of receivers.

An apparatus in accordance with the present invention displays a mosaic video channel, the mosaic video channel having a plurality of video cells presenting at least video information within each video cell, the plurality of video cells being presented at a given time, and comprises a broadcast delivery system, comprising a transmitter and a receiver, a monitor, coupled to the receiver, for selectively displaying the mosaic video channel, each video cell associated with one of a plurality of individual video feeds, and an announcer audio portion selectively coupled to one of the plurality of individual video feeds which replaces a standard audio portion associated with that individual video feed.

Such an apparatus further optionally comprises the broadcast delivery system being a satellite television delivery system, a plurality of mosaic video channels, an indicator being used to select the announcer audio portion, the indicator indicating that the announcer audio portion is being superseded by the at least one respective audio portions, the announcer audio portion being generated in real time, and access being granted only to a subset of the plurality of mosaic video channels at a given time.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents to the claims appended hereto.

What is claimed is:

1. A system for indicating an audio input for a mosaic video channel distinct from a program guide displayed on a monitor, with a plurality of individual video feeds being presented at a given time, comprising:

a plurality of video cells presenting at least video information, each video cell having a respective audio track associated with the video information;

an announcer audio track distinct from the respective audio tracks associated with the video information in the video cells, the announcer audio track being related to the plurality of video cells and transmittable as a replacement for any of the respective audio tracks during presentation of the video information; and an indicator, coupled to the respective audio tracks that can be seen by an announcer, for indicating outside of the mosaic video channel that at least one of the respective audio tracks is active, wherein the indicator signifies to the announcer to pause the announcer audio track, and the announcer is silent in response, such that the announcer audio track does not interfere with the active audio track of the video information being displayed on the monitor.

2. The system of claim 1, wherein the indicator indicates that the announcer audio track is being superseded by the at least one respective audio tracks.

3. The system of claim 1, further comprising a controller, coupled to the plurality of video inputs, wherein the controller controls the indicator.

4. The system of claim 3, wherein the controller further controls output of the announcer audio track and the at least one respective audio tracks to a receiver.

5. The system of claim 1, wherein the announcer provides the announcer audio track in real time.

6. The system of claim 1, further comprising a satellite television delivery system for selectively delivering the plurality of video cells and the announcer audio track to a plurality of receivers.

7. An apparatus for displaying a mosaic video channel distinct from a program guide, the mosaic video channel having a plurality of video cells presenting at least video information within each video cell, the plurality of video cells being presented at a given time, comprising:
   a broadcast delivery system, comprising a transmitter and a receiver;
   a monitor, coupled to the receiver, for selectively displaying the mosaic video channel, each video cell associated with one of a plurality of individual video feeds; and
   an announcer audio track distinct from standard audio tracks associated with the video feeds, the announcer audio track being related to the plurality of video cells and selectively coupled to one of the plurality of individual video feeds which replaces the standard audio track associated with that individual video feed, wherein an indicator that can be seen by an announcer signifies to the announcer to pause the announcer audio track, and the announcer is silent in response, such that the announcer audio track does not interfere with the standard audio track that the announcer audio track replaces while the standard audio track is active.

8. The apparatus of claim 7, wherein the broadcast delivery system is a satellite television delivery system.

9. The apparatus of claim 8, further comprising a plurality of mosaic video channels.

10. The apparatus of claim 9, wherein the indicator is used to select the announcer audio track.

11. The apparatus of claim 10, wherein the indicator indicates that the announcer audio track is being superseded by the standard audio track.

12. The apparatus of claim 11, wherein the announcer audio track is generated in real time.

13. The apparatus of claim 12, wherein access is granted only to a subset of the plurality of mosaic video channels at a given time.

\* \* \* \* \*